US012699682B2

(12) United States Patent
Geltner

(10) Patent No.: US 12,699,682 B2
(45) Date of Patent: Aug. 4, 2026

(54) AUTOMATED PLANT MONITORING SYSTEMS AND METHODS

(71) Applicant: ARUGGA A.I FARMING LTD, Even Yehuda (IL)

(72) Inventor: Iddo Geltner, Even Yehuda (IL)

(73) Assignee: ARUGGA A.I FARMING LTD, Even Yehuda (IL)

( * ) Notice: Subject to any disclaimer, the term of this patent is extended or adjusted under 35 U.S.C. 154(b) by 1032 days.

(21) Appl. No.: 17/624,651

(22) PCT Filed: Jun. 30, 2020

(86) PCT No.: PCT/IL2020/050729
§ 371 (c)(1),
(2) Date: Jan. 4, 2022

(87) PCT Pub. No.: WO2021/005589
PCT Pub. Date: Jan. 14, 2021

(65) Prior Publication Data
US 2022/0272907 A1 Sep. 1, 2022

Related U.S. Application Data

(60) Provisional application No. 62/870,885, filed on Jul. 5, 2019.

(51) Int. Cl.
G06F 16/23 (2019.01)

(52) U.S. Cl.
CPC .................................... G06F 16/23 (2019.01)

(58) Field of Classification Search
CPC .......... G06F 16/23; G06F 16/21; G06F 16/24; G06F 16/25; A01G 7/06
See application file for complete search history.

(56) References Cited

U.S. PATENT DOCUMENTS 9,107,337 B2 * 8/2015 Bassett .................. A01B 71/02
10,369,693 B1 * 8/2019 Levine ................... A01C 7/085
(Continued)

FOREIGN PATENT DOCUMENTS

JP 2013150584 A 8/2013
KR 101802189 B1 11/2017
(Continued)

*Primary Examiner* — Miranda Le
(74) *Attorney, Agent, or Firm* — FisherBroyles, LLP; Roger L. Browdy; James E. Mrose

(57) ABSTRACT

Systems and methods for managing operation of plant growth zone(s) are presented, the management system comprising: a storage device comprising a database that stores data indicative of plant characteristics for each plant in the plant growth zone, the plant characteristics comprising plant spatial and environmental characteristics and plant location in the plant growth zone; and a data processing unit comprising a database manager configured to create a new, or update an existing, database entry record corresponding to a plant in the plant growth zone, in response to sensing data being received from sensing system(s), the sensing data being part of visit data indicative of a visit by the sensing system(s) to the individual plant, and create a data retrieval record in response to data request input with respect to plant(s) in the plant growth zone, the database manager comprising: a sub-plant features extraction module configured to identify in the visit data spatial sub¬plant features of each plant sensed during a visit, and a plant structure data generation module configured to generate plant structure data corresponding to the identified spatial sub-plant features, the database manager being configured to create the new, or update the existing, database entry record, to store said plant structure data in the database, and identify, in the data request input, each plant, and utilize the plant structure data stored in the database to create the respective data retrieval record; the plant structure data is configured such (Continued)

Sensing / Treatment System(s) 200

114
112
Visit Data, including Sensing Data

Plant 105

Network

Management system 100

Some of the Network connections are optional

Data processing unit 101

Database Manager 102

Sub-Plant Features extraction module 120

Plant Structure Data generation module 122

124
Create/update individual plant Database Entry Record, including Sub-plant Structure data Storage Device 106

Network

Plant Database 108

Plant Characteristics 110

Retrieve Individual plant Database Entry Record, including Sub-plant Structure data 126
Network data retrieval record Data Request
116 that contents of the database entry record and/or the data retrieval record comprise a virtual representation of the corresponding plant's structure in accordance with locations of the spatial sub-plant features and their dimensions matching a real structure of the plant.

12 Claims, 6 Drawing Sheets

(56) References Cited

U.S. PATENT DOCUMENTS

| 10,602,664 | B1 * | 3/2020 | Stubbs | B25J 9/1697 |
| 10,645,881 | B2 * | 5/2020 | Skinner | A01G 25/02 |
| 11,244,398 | B2 * | 2/2022 | Greenberg | A01G 7/00 |
| 11,287,411 | B2 * | 3/2022 | Miresmailli | G01N 33/0098 |
| 11,663,414 | B2 * | 5/2023 | Bongartz | G05B 15/02 |
| | | | | 704/9 |
| 11,818,982 | B2 * | 11/2023 | Corban | A01D 61/02 |
| 2010/0268391 | A1 | 10/2010 | Anderson | |
| 2014/0173769 | A1 | 6/2014 | Leyns et al. | |
| 2015/0015697 | A1 | 1/2015 | Redden et al. | |
| 2016/0050852 | A1 * | 2/2016 | Lee | B25J 9/023 |
| | | | | 901/41 |
| 2016/0243696 | A1 * | 8/2016 | Kahani | B25J 9/023 |
| 2016/0247076 | A1 * | 8/2016 | Mewes | G06N 5/04 |
| 2017/0030877 | A1 | 2/2017 | Miresmailli et al. | |
| 2017/0032258 | A1 | 2/2017 | Miresmailli et al. | |
| 2018/0082375 | A1 * | 3/2018 | Greenberg | G06Q 50/02 |
| 2018/0271029 | A1 | 9/2018 | Hatamian | |
| 2018/0325051 | A1 * | 11/2018 | De Mello Brandao | |
| | | | | G06F 18/24133 |
| 2019/0064363 | A1 * | 2/2019 | Redden | G06V 10/751 |
| 2019/0170718 | A1 | 6/2019 | Miresmailli et al. | |
| 2020/0359550 | A1 * | 11/2020 | Tran | G06Q 30/0206 |

FOREIGN PATENT DOCUMENTS

| WO | 2018073899 A1 | 4/2018 |
| WO | 18203337 A1 | 11/2018 |
| WO | 2020/095290 A1 | 5/2020 |

* cited by examiner

AUTOMATED PLANT MONITORING SYSTEMS AND METHODS

TECHNOLOGICAL FIELD

The present invention is in the agricultural field and relates to monitoring of plants, such as plants in greenhouses, and management of the data collected during monitoring.

BACKGROUND

In modern industrialized agriculture there is a growing need to produce more crops, within a limited area, with decreasing resources, especially labor, and the need to further decrease the use of chemicals aimed at fighting pests and diseases. This requires a lot of monitoring and care of the crops across their whole lifecycle. For example, in some greenhouse crops this may last for eleven months every year.

Plant monitoring tasks include, for example, monitoring plant growth, fruit development and yields, detection of stresses, pests, disease, a-biotic stresses such as under- or over-fertilization and watering. Monitoring can also include monitoring of tasks performed by humans or robots, such as pollination and pruning.

Currently, most monitoring of crops is performed manually, or by using static sensors placed in the vicinity of plants, or by placing static sensors adjacent to a limited (small) number of sample plants in the area monitored.

Due to labor shortages in agricultural sectors and in geographical locations, plant monitoring is typically limited to a very small percentage of sampling, if at all. For example, when monitoring status of tomato plants in greenhouses for determining watering, fertilization and yield prediction, a maximum of 10-20 plants are monitored per hectare, which contains 20,000 plants or more. Not only is it costly to monitor those plants, since there is a need for a well-trained expert to perform such tasks, there is also the cost of entering the data, analyzing it and making decisions upon it.

US patent application 20170030877 describes a multi-sensor device for capturing and transmitting sensor data for plants in a crop. The multi-sensor device can be used as a hand-held device or mounted on a mobile platform for use in an automated crop monitoring system. A control unit in the device is operable to control the sensors, and a communications interface is connected to the control unit for transmitting data from the sensors. Plant data is collected in two phases—training and testing, using the various sensors and human expert data.

US patent application 20170032258 describes systems and methods for monitoring and assessing crop health and performance that can provide rapid screening of individual plants. The systems and methods have an automated component, and rely primarily on the detection and interpretation of plant-based signals to provide information about crop health. Knowledge from human experts is captured and integrated into the automated crop monitoring systems and methods. Predictive models can also be developed and used to predict future health of plants in a crop.

GENERAL DESCRIPTION

The present invention provides novel techniques for monitoring plants during the growth and fruitage cycles including, for example, monitoring plant conditions such as plant health, predicted yields, readiness for pollination and post pollination, and for tracking actions performed on the plants.

The technique of the present invention enables rapid collection and wise management of huge amounts of plant data, including saving and organizing the plant data as well as retrieval of the plant data, in a meaningful and efficient way and down to the individual plant at the spatial sub-plant level. The plant management systems and methods of the invention facilitate the collection of the plant data and the interpretation and retrieval of the plant data, by providing up-to-date structured plant data about each individual plant, at the spatial sub-plant level, to thereby maintain optimal plant condition and health in every stage of the plant life cycle, including by applying required interventions at the right time. Management of the structured plant data according to the invention enables full tracking in location and time and treating, as needed, of every portion and sub-portion of every individual plant in a large plant growing area, while saving time, effort and resources, thereby increasing the monitoring efficiency and crop yield.

The terms level(s), region(s), portion(s), element(s) and section(s) are used herein interchangeability to describe sub-plant related aspects.

Sub-plant level as described in this invention refers to any combination of the following: specific branches of a given plant, specific leaves on a given branch, specific flowers and/or fruits on a given branch, specific flower branches/ trusses, specific flowers and/or fruit on a given flower branch/truss/inflorescence.

Up-to-date structured plant data about each individual plant may also include data on treatments (and their status and success) performed on plants and/or spatial sub-plant levels/regions/portions of the plant, and data about environmental or soil conditions nearby each plant and sub-plant region.

The plant management systems and methods of the present invention are autonomous and do not require human attention or intervention. They are based on robotic monitoring device(s) that can approach each specific plant at the sub-plant level to monitor each plant at the sub-plant level and provide the structured plant data.

As many plant visits as needed, no more no less, can be planned and operated to maintain the plants in optimal condition. The plant management systems provide both pre-planned monitoring path or on-the-spot monitoring path of plants and their sub-plant portions in the growing area, and can, for example, optimize scanning to plant portions and sub-portions in a specific area which are prone to specific problems, for example the existence of a pest near entrances to a greenhouse, or pests at the edges of fields, etc.

To this end, data collection sensors may be placed on a mobile platform that can autonomously drive in designated areas of the field/orchard/greenhouse and cover necessary plants or all plants. The sensors are placed on the mobile platform such that all data required can be collected—the position of the sensors enable them to acquire data from the required parts and elements of the plant. Imaging sensors adjacent to other sensors can determine the development of sub-plant elements, and associate other sensor readings to specific plants and specific sub-plant elements.

Accordingly, a database including the structured plant data is built and associates plants and their sub-plant elements with sensor readings and timing of the readings. If, in addition, actions, such as pollination, pruning and pesticide treatment, are performed, the plant management system can record the tasks performed and the exact location and timing of the sub-plant element on which the task was performed, and save all in the database. The database has a plurality of database entry records corresponding to a respective plurality of plants in the plant growth zone/area. That said, each plant in the plant growth zone has its database entry record which is created when data relating to the plant is collected for the first time and is updated (adding data and keeping the previous data) whenever additional data relating to the plant is collected.

Thus, according to a first broad aspect of the invention there is provided a plant management system for managing operation of one or more plant growth zones being subscribers of the management system, the management system comprising:

a storage device comprising a database that stores data indicative of plant characteristics for each individual plant in the plant growth zone, the plant characteristics comprising plant spatial and environmental characteristics and plant location in the plant growth zone; and a data processing unit comprising a database manager configured and operable to create a new, or update an existing, database entry record corresponding to an individual plant in the plant growth zone, in response to sensing data being received from one or more sensing systems, the sensing data being part of visit data indicative of a visit by said one or more sensing systems to the individual plant, and create a data retrieval record in response to data request input with respect to one or more individual plants in the plant growth zone, said database manager comprising:

a sub-plant features extraction module configured and operable to identify in the visit data spatial sub-plant features of each individual plant sensed during a visit, and a plant structure data generation module configured and operable to generate plant structure data corresponding to the identified spatial sub-plant features, the database manager being configured and operable to create the new, or update the existing, database entry record, to store said plant structure data in the database, and identify, in the data request input, each of said one or more individual plants, and utilize the plant structure data stored in the database to create the respective data retrieval record;

said plant structure data is configured such that contents of the database entry record and/or the data retrieval record comprise a virtual representation of the corresponding individual plant's structure in accordance with locations of the spatial sub-plant features and their dimensions matching a real structure of the individual plant.

In some embodiments, the visit data comprises time data indicative of time of execution of said visit by the one or more sensing systems in the plant growth zone, thereby enabling recordation of a history of visits with respect to each individual plant in the plant growth zone.

In some embodiments, the visit data comprises location data indicative of position of execution of said visit by the one or more sensing systems in the plant growth zone, thereby enabling recordation and/or retrieval of the plant location of each individual plant in the plant growth zone.

In some embodiments, the visit data comprises environmental data indicative of said environmental characteristics of each individual plant, and wherein said database entry record and/or data retrieval record is indicative of temperature of a portion of the individual plant and/or indicative of temperature and/or humidity in a vicinity of each individual plant in the plant growth zone.

In some embodiments, the visit data comprises soil condition data, and wherein said database entry record and/or data retrieval record is indicative of nutrition and/or water content associated with each individual plant in the plant growth zone.

In some embodiments, the spatial sub-plant features of each individual plant comprise one or more of the following: geometry and/or dimensions and/or health state and/or number and/or temperature of branches and/or trusses and/or inflorescences and/or leaves and/or flowers and/or fruit. The health state of the flowers may comprise pollination and/or pruning state of the flowers.

In some embodiments, the database manager is further configured and operable to analyze said stored plant structure data relating to each sub-plant feature of each individual plant and, upon identifying a predetermined condition of one or more sub-plant features, generate corresponding operation data to apply a visit to the relevant individual plant. The operation data may be indicative of one or more treatment plans to be applied by one or more treatment systems to said spatial sub-plant feature(s) of the relevant individual plant (s). The treatment plan may comprise applying pollination and/or pruning and/or disinfection to said spatial sub-plant feature of the relevant individual plant. The database manager may be configured and operable to create a database entry treatment record in response to treatment data being received from the one or more treatment systems, the treatment data comprising data indicative of a treatment applied by said one or more treatment systems to a spatial sub-plant feature of the relevant individual plant, to thereby store said database entry treatment record and assign it to said spatial sub-plant feature.

In some embodiments, the system comprises one or more sensing systems configured and operable to provide said sensing data, each sensing system comprising one or more sensors including at least one imaging sensor such that said visit data comprises image data of said spatial sub-plant features. The system may comprise one or more treatment systems configured and operable to apply said one or more treatment plans.

In some embodiments, the system comprises a central station comprising said storage device and said database manager, the central station being configured as a computer system for data communication, via a communication network, with the one or more sensing systems and/or the one or more treatment systems. The one or more sensing systems and/or treatment systems may be carried by one or more robotic vehicles configured to navigate inside the plant growth zone, based on operation data from said database manager, to apply said one or more visits to said one or more individual plants in the plant growth zone.

According to another broad aspect of the invention, there is provided a method for managing data of plants in one or more plant growth zones, the method comprising:

receiving visit data indicative of plant characteristics for one or more individual plants in the plant growth zone, the plant characteristics comprising plant spatial and environmental characteristics and plant location in the plant growth zone; the visit data comprising sensing data obtained from the one or more individual plants in the one or more plant growth zones, analyzing the sensing data to identify spatial sub-plant features of each individual plant sensed during a visit, and generating plant structure data corresponding to the identified spatial sub-plant features, creating a new, or updating an existing, database entry record corresponding to an individual plant in the plant growth zone, to store said plant structure data, said plant structure data is configured such that contents of the database entry record comprise a virtual representation of the corresponding individual plant's structure in accordance with locations of the spatial sub-plant features and their dimensions matching a real structure of the individual plant.

According to another broad aspect of the invention, there is provided a method for managing data of plants in one or more plant growth zones, the method comprising creating, in response to a data request, a data retrieval record from stored plant structure data corresponding to one or more individual plants in the one or more plant growth zones and generated from visit data obtained from one or more visits to the one or more individual plants, contents of the stored plant structure data and/or the data retrieval record comprising virtual representations of the one or more individual plants in accordance with locations of spatial sub-plant features and their dimensions matching real structure of the one or more individual plants.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
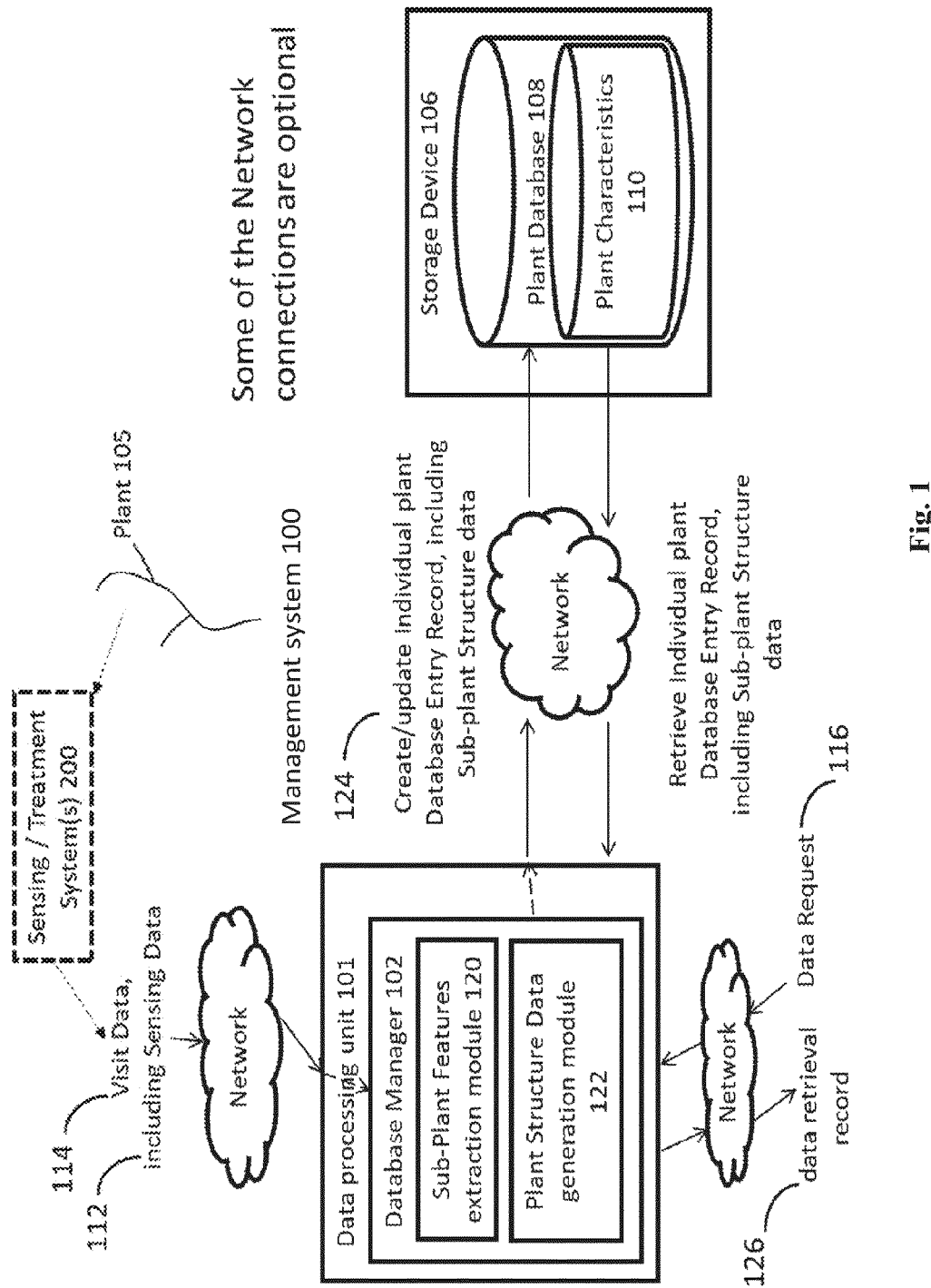
FIG. 1 illustrates by way of a block diagram an exemplary embodiment of a plant monitoring and management system according to the invention.

Reference is made to FIG. 1 that illustrates by way of a block diagram an exemplary embodiment of a plant management system 100 for managing operation of one or more plant growing zones/areas, e.g. greenhouses, in accordance with principles of the present invention. The plant management system 100 can be configured as a central station located physically at a predetermined location or as a service that is located in the cloud or at a service server. In both cases, the plant management system 100 can be accessed via network connections, either wired or wireless connections, and the one or more greenhouses (being plant growing zones/areas, all used herein interchangeably) are subscribers of the management system such that one or more plant sensing and/or treatment systems 200, that will be exemplified further below, are located in the subscribed greenhouses and configured and operable to collect plant data or apply plant treatment, and exchange plant data, relating to each plant in each greenhouse, with the management system 100. As appreciated, the plant sensing and/or treatment systems 200 are not necessarily part of the management system 100, however in some exemplary embodiments, one or more of the plant sensing and/or treatment systems 200 can be an integral part of the management system 100.

As depicted, the management system 100 includes a storage device 106 including a plant database 108, and a data processing unit 101 including a database manager 102 connected to the plant database 108 in the storage device 106. The plant database 108 is configured to store data indicative of plant characteristics 110 for each individual plant in the greenhouse, the plant characteristics data 110 includes plant spatial and environmental characteristics data and plant location in the greenhouse. The plant characteristics 110 is built by the data of database entry records generated by the database manager 102.

The database manager 102 is configured and operable for performing at least two main functions. The first function is to create, or update an existing, database entry record 124 in response to sensing data 112, of a plant(s) 105, being received from the one or more sensing and/or treatment systems 200, where the sensing data 112 is included as part of the visit data 114 indicative of a visit by the one or more sensing and/or treatment systems in the greenhouse. The second function is to create a data retrieval record 126 in response to data request 116 with respect to one or more individual plants, such as plant 105, in the plant growing area/greenhouse. Accordingly, the database manager 102 is basically software based and may also include dedicated hardware components, being configured for processing and analyzing data. The database manager 102 includes a plant features extraction module 120, and a plant structure data generation module 122. The plant features extraction module 120 is configured and operable to identify in the visit data 114 spatial sub-plant features of each individual plant 105 sensed during the respective visit. The plant structure data generation module 122 is configured and operable to generate plant structure data corresponding to the spatial sub-plant features identified by the plant features extraction module 120. Based on the plant structure data generated by the plant structure data generation module 122, the database manager 102 creates a new, or updates an existing, database entry record 124 to store the individual plant's structure data, including sub-plant structure data, generated by the plant structure data generation module 122, as an individual plant database entry record 124 in the database 108. The database manager 102 is also configured and operable to extract, from a data request 116, identifiers for each of the one or more individual plants, and utilize the stored plant characteristics data 110 in the database 108 to create the respective data retrieval record 126. In one example, the visit data includes an image, or multiple images, of the plant and/or sub-plant feature and/or element, and the database manager 102, specifically the plant features extraction module 120, analyzes the image data to extract the spatial sub-plant features. The database manager 102 may utilize machine learning techniques for analysis of the sensing data.

Accordingly, the plant structure data, including sub-plant structure data, stored under plant characteristics 110, is configured such that contents of the database entry record 124 includes a virtual representation of the plant structure in accordance with locations and dimensions of the spatial sub-plant features matching a real structure of the respective individual plant 105. Each individual plant 105 is represented as a database entry record. That is, the "entries" of the database are "plants".

As mentioned above, each visit data 114 includes sensing data 112 obtained on an individual plant 105 by a sensing system or treatment system 200 that visited the individual plant. In addition, the visit data 114 can include time data indicative of time of execution of the visit by the one or more sensing and/or treatment systems in the greenhouse, thereby enabling recordation of a history of visits with respect to each individual plant in the greenhouse. The time data may also serve for managing the database entries by keeping the database entries up-to-date. For example, this enables rewriting the plant structure data in connection with any newly collected and/or analyzed sub-plant feature and/or element. The time data can be provided by any known clock/time machine which is integrated in the sensing and/or treatment system executing the visit.

Further, the visit data 114 can include location data indicative of position of execution of the visit by the one or more sensing and/or treatment systems in the greenhouse, thereby enabling recordation of the plant location of each individual plant and/or sub-plant feature and/or element in the greenhouse, and enabling saving and then retrieval of the individual plant and/or sub-plant feature and/or element in a way reflecting the plant's real structure, as will be further detailed below. The location data can be provided by any known location determination device or service, such as GPS, being integrated in the sensing and/or treatment system executing the visit.

Furthermore, the visit data 114 can include environmental data indicative of environmental characteristics of each individual plant, the environmental data includes one or more of the following: temperature, relative humidity, $CO_2$ levels, and lighting conditions. Environmental data may be generated at the sub-plant level. Moreover, the visit data 114 can include soil condition data of the soil in which the plant is planted, the soil condition data can include nutrition and/or water content for the individual plant. Suitable sensors for providing the temperature, humidity, light and/or soil conditions can be integrated in the sensing and/or treatment system executing the visit.

Accordingly, the database manager 102 is configured and operable to recognize or extract the time, location, environmental and/or soil data from the visit data 114 and generate one or more database entry records 124 being indicative of at least one or more of the following, during the specific visit: temperature of the individual plant or a sub-plant portion thereof, temperature and/or humidity and/or light in a vicinity of the individual plant, nutrition and/or water content associated with the individual plant. The time, location, temperature, humidity, light, nutrition and water content data can be recorded and/or registered and/or assigned to the specific plant and/or sub-plant portion that was the subject of the relevant visit.

The data processing unit 101 is, in general, an automatic and autonomous system, such that it is self-activated and it manages its inputs: the visit data 114, including sensing data 112, and data requests 116, and its outputs: the database entry record 124 and data retrieval record 126, autonomously and without human intervention. In some exemplary embodiments, the data request input 116 can be entered by a human supervising the greenhouse to thereby enable the supervising human to observe data of an individual plant or sub-plant portion of the individual plant, either in textual or graphical representation of the individual plant or sub-plant portion, and/or apply a monitoring and/or treatment visit to the individual plant or sub-plant portion of the individual plant. In some exemplary embodiments, the management system is configured and operable to create a three-dimensional graphical representation of the plant of portion of a plant, with the sub-plant features shown together with their values, as a result to a data request entered by a user. For example, a user can enquire the management system, through a data request input, to display the pollination status of one or more flowers on one or more flower branches on a specific plant in the farming area, in either textual or graphical fashion, and the management system generates the data retrieval record based on the plant characteristics 110 as saved in the database 108 and displays the requested information to the user.

In some exemplary embodiments, the data request 116 is generated by the database manager module 102 based on analysis done, in accordance with built-in algorithms, on the plant characteristics 110 saved in the database 108, or based on built-in algorithms relating to periodical monitoring and/or treating of plants. Accordingly, the database manager module 102 is configured and operable to analyze the stored plant structure data relating to each sub-plant portion/feature of each individual plant and, upon identifying a predetermined condition of one or more plants and/or sub-plant features, generate corresponding operation data to apply a visit to the relevant individual plant. The operation data is indicative of one or more treatment plans to be applied by one or more treatment systems to the spatial sub-plant feature(s) of the relevant individual plant(s). In some exemplary embodiments, the treatment plan includes applying pollination and/or pruning and/or disinfection to the plant and/or spatial sub-plant feature of the relevant individual plant.

The plant characteristics 110 saved in the database 108 may also be analyzed in macro fashion based on collective sub-plant features and without referring to specific individual plants. For example, an analysis of the number of flowers in the plant growth zone, and their status.

As described above, the database manager 102 is configured and operable to analyze each visit data received. The plant features extraction module 120 identifies the spatial sub-plant features of each individual plant sensed during the respective visit. The plant structure data generation module 122 is configured and operable to generate the plant structure data, which is used to create a new, or update an existing, database entry record 124 of the individual plant structure data, including sub-plant structure data. The spatial sub-plant features that are identified include, inter alia, one or more of the following: geometry and/or dimensions and/or health state and/or number and/or temperature, of branches and/or trusses and/or inflorescences and/or leaves and/or flowers and/or fruit. The health state of flowers can refer to pollination and/or pruning state of the flowers. By updating the database entry record 124 following each visit, a history of the plant status and evolution, at the sub-plant feature level, is generated within each database entry record for a given plant.

As described above, the management system 100 can communicate with one or more sensing and/or treatment systems to receive the sensing data therefrom and to send operation data thereto, e.g. in the form of a data retrieval record, based on analysis of the incoming sensing data or based on a request data provided by a human supervisor, or by an automated or computerized request. To this end, the data retrieval record provided by the management system 100 can be in the form of operation data to the sensing and/or treatment systems to operate those systems for inspection and/or treatment application on an individual plant as a whole or at the sub-plant level. The sensing and/or treatment systems can be for example the sensing and/or treatment systems described in WO18203337, assigned to the assignee of the present invention. In some exemplary embodiments, as will be further described below, the management system 100 includes one or more sensing and/or treatment systems adapted for sensing and/or applying treatment to plants or specifically to sub-plant elements.

The present invention also provides methods for managing plant data in one or more plant growth zones. The methods can be executed by the systems described herein or by other systems capable of performing the steps mentioned below. In one method, the steps include: receiving visit data indicative of plant characteristics for one or more individual plants in the plant growth zone, the plant characteristics include plant spatial and environmental characteristics and plant location in the plant growth zone. The visit data include sensing data obtained from the one or more individual plants in the one or more plant growth zones; analyzing the sensing data to identify spatial sub-plant features of each individual plant sensed during a visit, and generating plant structure data corresponding to the identified spatial sub-plant features; creating a new, or updating an existing, database entry record corresponding to an individual plant in the plant growth zone, to store the plant structure data.

In a second method, the steps include: creating a data retrieval record from stored plant structure data corresponding to one or more individual plants in the one or more plant growth zones and generated from visit data obtained from one or more visits to the one or more individual plants.

As described above, the contents of the stored plant structure data and/or the data entry record and/or the data retrieval record include virtual representations of the one or more individual plants in accordance with locations of spatial sub-plant features and their dimensions matching real structure of the one or more individual plants. This way, a plant database having the plants as its entries, such as the database 108, is created and virtually reflects the real structure of the plants in connection of spatial features and/or sub-features of the plant, enabling data recordation, retrieval and analysis in effective and efficient ways.

Figure 2:
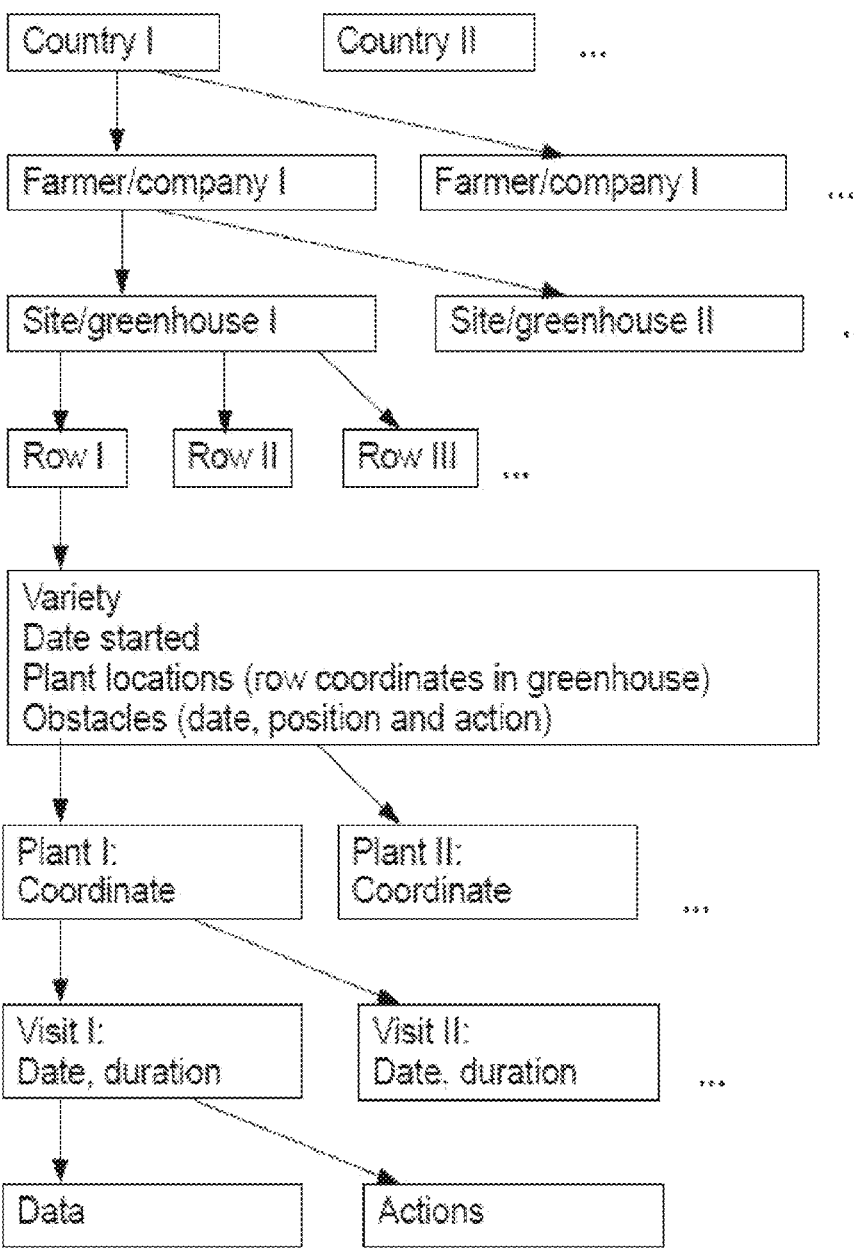
FIG. 2 illustrates a non-limiting example of a plant database according to the invention.

Reference is made to FIG. 2 that depicts a non-limiting example of a general structure of the database 108 built by and included in the management system 100 based on the visit and sensing data received. As shown, the general structure of the exemplified database is suitable for being saved in a central station or server and as such it can be used to manage plant data acquired and transferred to the database from one or more plant growing sites/greenhouses belonging to one or more farmers (individuals/companies/etc.) in one or more countries. In each site, the collected plant data refers to plant characteristics of each plant in the site. Therefore, each site can be presented by, for example, a plurality of plant rows where each row is identified (numbered or using coordinates or beginning of row for example), and the specific coordinates of the row can also be indicated, again either with a number (e.g. $5^{th}$ from south in row 11), or physical coordinates. Also, for each row, general characteristics of the plants in the row, such as the type and variety of plant/crop, location of each plant (again as physical coordinates or the plant's order (number) in the raw, date of plantation of the individual plant, can be included in the database. Obstacles on the path of the row can also be identified by suitable sensors and indicated in the database for the relevant row. It should be noted that information regarding the row, e.g. obstacles, may be updated dynamically, based, for example, on inputs received from mobile units traveling within the greenhouse and carrying one or more sensing systems.

The database includes the data acquired per plant in a row in the greenhouse. The individual plant data can be related to a specific visit of the sensing and/or treatment systems, as mentioned above, where each visit to each individual plant can be identified by date, time and duration of each visit. In each specific visit, sensing data of the individual plant is recorded and saved to the database, as described above. The database stores data indicative of plant characteristics for each individual plant in the row/greenhouse. The sensing data is analyzed and processed by the database manager and the sub-plant features are determined and characteristics of each plant, reflecting the plant structure data, are represented as a database entry record. The plant structure data can include plant characteristics such as: whole plant characteristics, sub-plant spatial characteristics, plant (and sub-plant) environmental characteristics, and plant location in the greenhouse. If plant treatment systems are used, and the analysis on the plant characteristics by the management system indicated that it is appropriate to utilize the plant treatment systems, the individual plant data in the database can also be updated with the visit of the plant treatment system to the individual plant. The data of the treatment visit can include what treatments/actions were performed, the nature of the action/treatment, time, and duration. The data and action data can include the identity/serial number of the sensing/treatment system collecting/performing such data collection/treatment.

Figure 3:
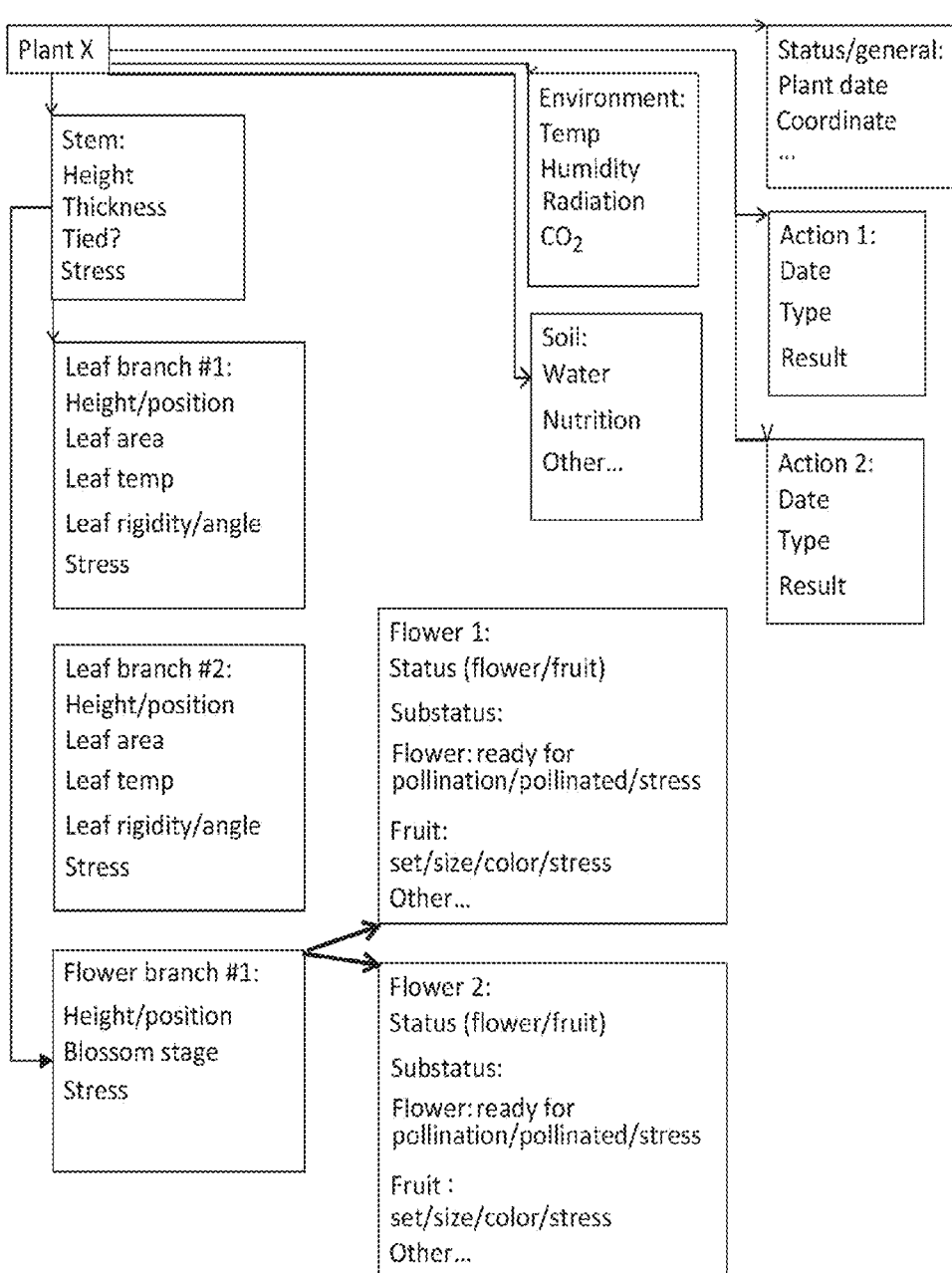
FIG. 3 illustrates a non-limiting example of a plant level and its sub-plant levels entries in a plant database according to the invention.

Reference is now made to FIG. 3 illustrating a non-limiting example of a plant structure and characteristics data of an individual plant as saved in the database as a database entry record, including sub-plant features/elements. As shown in the figure, the plant structure is configured such that contents of the database entry record include a virtual representation of the plant structure in accordance with locations of the spatial sub-plant features and their dimensions matching the real structure of the plant. Non-limiting details about the data that can be collected on each individual plant as a whole plant as well as data pertaining to sub-plant features/characteristics are shown in the figure. General plant data/characteristics recorded per plant, e.g. plant X, can be the plant variety, planting date, type of soil, other agricultural parameters such as cultivation methods (e.g. cover of greenhouse, protection of trees in orchard, etc.), watering and fertilization methods. At least some of these general plant data/characteristics can be provided by a human user/supervisor. The environmental conditions in the immediate area of the plant or sub-plant element, can also be recorded, including temperature, relative humidity, lighting conditions and $CO_2$ content of air which is important in greenhouse crops in particular. Soil conditions in the near vicinity of the plant can be recorded by a specific sensor of the sensing system. As mentioned above, the plant data can include visit entries including the type and date of visit, sensing/treatment system visiting, and action taken at visit and its results. Actions can be performed on a sub-plant feature/element, such as a specific branch, flower or stem/trunk, or on the whole plant. The results of such action therefore can be recorded per plant or per sub-plant feature/element if applicable. As appreciated, the database structure imitates the plant structure and a replica of the plant is built in the database to record all relevant data and actions per portion of the plant and its sub-plant features/elements. The database entry record as well as the data retrieval record per plant is unique since each plant will have a unique virtual representation of its physical structure. The database includes all sub-plant features and each sub-plant feature can have its sub-elements. For example, as depicted in the figure, the main stem has three branches, each branch can be of a different type and have different characteristics, including for example when it initially appeared, and was recorded by the system, it's position on the main stem, number of sub-elements it has at a specific point in time, and whether or not a treatment procedure was applied to this sub-plant part. The exemplified main stem has three branches, two branches are leaf branches and the third branch is a flower branch. The flower branch at a specific point in time, as recorded in a specific visit, has two flowers with their status recorded.

In one example, the database entries for a specific plant can be described as having levels, as follows:

Level I: Main trunk/stem; examples for tags for each main trunk/stem: physical characteristics such as dimensions (length, thickness), coloring, growth rate (obtained through consecutive visits);

Level II: main branches; examples for tags for each main branch: distance along level I object, date of generation, date of data update, physical characteristics such as dimensions (length, thickness);

Level III: Secondary branches; examples for tags for each secondary branch: position along level II object, date of generation, date of data update, physical characteristics such as dimensions (length, thickness);

Level IV: flower branches/truss/inflorescence; examples for tags for each flower branch: distance along level I object or position relative to level II object, date of generation, date of data update, physical characteristics such as dimensions (length, thickness), number of flowers (deduced from collected data of individual flowers and their link to branch);

Level V(a): individual flower; examples for tags for each flower: position relative to level IV object, date of generation, date of data update, physical characteristics such as diameter, status (e.g. bud, anthesis, fruit set, fruit size, shape, color, maturity stage of fruit);

Level V(b): individual leaves; examples for tags for each leaf: position relative to level I,II,III or V(a) object, date of generation, date of data update, physical characteristics such as area, stress (e.g. existence of pest and/or disease).

It is noted that the distribution into levels is not a strict structure, i.e. it is not necessarily in this order and can take a variety of forms; for example, a level V(b) leaf can be connected to a level IV flower branch, or to a level III secondary branch, or maybe even to a level II main branch.

As mentioned, the plant data from a specific visit can be updated in the database record, including, for example, the environmental and soil conditions. Moreover, it is possible to register sub-plant environmental characteristics, including temperature, relative humidity, $CO_2$ concentration and lighting, that can be different near different sub-plant elements. For example, parts of the plant which are lower and more internal can have less lighting, parts of the plant which are higher can have quite different temperature and lighting conditions. The different above-mentioned parameters can be measured using sensors placed at different heights of the sensing system, or placed on a robotic arm which can move and reach different sub-plant parts, as will be exemplified further below.

The sub-plant features can evolve, and the database entry record relating to each sub-plant feature can be updated; for example, a flower monitored can evolve in phases, starting from a bud until a fully mature flower, and then the flower can be pollinated (whether performed by a dedicated pollination system, or naturally), then as the flower becomes a fruit, the management system monitors the fruit developing until ripeness and harvest.

Thus, the database contains all parts of the plant, their appearance (adding features to the plant) or disappearance, e.g. when fruits are harvested or flowers and/or branches are pruned. The database entries therefore can be added or removed from the current plant status in the database. Additionally, the entries' history can be kept for future reference and analysis, such that it is possible to generate a data retrieval record reflecting the plant structure at a specific point in time, in the present or in the past.

As described above, the management system 100 may communicate with or include one or more sensing and/or treatment systems configured and operable to visit the individual plant or sub-plant feature/element and provide the sensing data for that visit, based on operation data from the management system. The sensing and/or treatment systems can be configured as mobile units that navigate the plant growing area/greenhouse to apply a visit to the relevant plant or sub-plant part/element. As such, the sensing and/or treatment systems can be carried by one or more robotic vehicles configured to navigate inside the greenhouse. Herein below, various non-limiting examples of such sensing and/or treatment systems are described.

The sensing systems are configured and operable to monitor the plant during all of its growth stages, including the stage of flower blossoming, pollination and fruitage, stresses such as pests and diseases, and once a predetermined condition of the plant, relating to one or more of the plant growth stages, is identified, the management system can generate operation data for a plant treatment system to apply a corresponding treatment. As described above, a treatment may be applied based on instructions/plan determined by analysis of the database, or by user inputs. In some embodiments, and as will be further detailed below, the management system 100 can monitor the health of the plant, by suitable sensor(s) of the sensing system, and upon identifying that the plant suffers from a specific problem (disease/condition/pest/etc.), the management system operates the at least one treatment system to apply a corresponding treatment to the plant, or a portion of it, or its surrounding, such as by delivering a suitable drug/medicament/pesticide/beneficial insects/lighting/hot air or any other treatment that once applied can take care of the problem.

It is noted that in some embodiments, an additional control system can be utilized to communicate with the sensing and/or treatment systems and with the management system 100 such that the control system can be configured, for example, to perform at least part of the analysis of the sensing data, or control the navigation and/or data collection of the sensing system. In some embodiments, the control system and management system are used herein interchangeably with regard to receiving and analyzing the sensing data and with regard to the generation of operation data to the one or more sensing and/or treatment systems. In some embodiments, each or at least some of the sensing and/or treatment systems have their own control system communicating with the management system 100.

The sensing systems monitor, by one or more sensors, a condition of the plant, generate corresponding sensing data and send the sensing data to the management system 100, e.g. to the database manager, or to a control system connected therebetween. Additionally, a feedback system can be included in the management system 100, or control system, or the treatment system, and enables acquisition of feedback data, e.g. by an imaging sensor, regarding the plant condition during the treatment process. The management/control system receives the sensing data and/or the feedback data, and processes the sensing/feedback signals to determine the condition of at least portion of the plant. If it is determined that treatment should be employed, the control system operates the at least one plant treatment system, by generating operational data and sending it thereto to apply a corresponding treatment to the at least portion of the plant.

The control system can be configured as a separate element, or it can be configured in other ways too. For example, the control system can be an integral part of either the sensing system or the treatment system or the management system, or can be distributed there between. Further, it is noted that the control system, or a part thereof, can run on an external server that communicates with the other elements via network, whether wired or wireless network. The control system can also optionally be connected to a remote processing and analysis system, which performs part or all of the analysis required in order to manage the monitoring of the plant growing area. When forming part of the sensing and/or treatment systems, the control system may keep snapshots of the database 108 in order to be able to perform processing and analysis in real time without need of constant communication via network with the management system.

In some embodiments, when there is no treatment system available for the required treatment or in general, the control system can suggest a treatment to the grower/farmer/user. Once treatment is performed by a suitable treatment system or a human, the control system enables the user to enter the treatment data (what treatment was performed, by whom, on which plant and sub-plant element, when it was performed, and the result of such treatment).

In some embodiments, the treatment system is configured and operable to apply treatment to the at least one portion of the plant by controllably inducing a vibration pattern/profile in the at least one portion of the plant. The vibration pattern is defined to the desired kind of treatment to be applied, by controlling, e.g. via the control system, the parameters of the profile of the vibration pattern. The treatment system can be configured to apply the vibration pattern to one or more regions in the at least one portion of the plant to thereby achieve the required treatment in the minimum energy and/or time. The vibration pattern/profile, induced in the one or more regions of the at least one portion of the plant, can be applied in a contact or contactless manner.

The treatment system can include one or more treatment channels with at least one treatment device being associated with one or more of them. The one or more treatment channels include channel(s) that the plant treatment device uses/requires in order to apply the treatment to the plant. The treatment channel(s) can form an internal part of the plant treatment apparatus or system, or in some cases can be external to it. The treatment channel(s) can be an entry, an intermediate or an exit part with respect to the one or more plant treatment devices. It should be noted that, in some embodiments, more than one plant treatment device can be associated with a single, common, treatment channel. In some embodiments, a single plant treatment device can be associated with more than one treatment channel. For example, the treatment channels can include a fluid flow channel configured and operable to provide a flow of fluid, either in gas or liquid or aerosol phase, that the plant treatment device utilizes to apply the treatment. In one specific example, the fluid flow channel is utilized by the plant treatment device in order to generate an air-flow or to blow air towards one or more regions of the at least portion of the plant. The treatment channel can provide pruning of unnecessary flowers, apply pesticide or any other disease treatment to a portion of the plant, or provide air with certain relative humidity in order to change the environmental conditions near the portion of the plant being treated, or provide directed fertilization on portion of the plant.

In the sensing system, one or more sensors can be included, being capable of sensing signals indicative of the characteristics and/or a condition(s) of the portion of the plant under examination, the sensors can include at least an optical sensor configured and operable to provide the sensing signals indicative of image data of the at least portion of the plant. The optical sensor can be a camera pointing directly towards the portion of the plant under examination, or can have or be associated with an aperture pointing towards the portion of the plant (e.g. by utilizing an optical fiber while the sensor itself has no direct line of sight with the portion of the plant), or can have a field of view that includes the portion of the plant, etc. The image data can be indicative of a variety of conditions of the sub-plant portion that their identification invites a respective treatment by a suitable treatment system. For example, the image data can teach about diseases of the plant, readiness of one or more flowers to pollination, existence of already pollinated flowers, distance between the treatment device and the at least one portion of the plant, vibration pattern occurring during treatment in the flower, etc.

Several kinds of sensing and/or treatment systems can be used to provide the sensing data or to apply the required treatment.

Non-limiting examples of sensing devices for providing the sensing data to enable structuring the database entry records include:

sensing devices/systems described in WO18203337 and in PCT/IL2018/051201, assigned to the assignee of the present invention;

Optical sensors that provide images of the plants at the sub-plant level; the optical sensors can be configured to provide plant images from a variety of angles to enable three-dimensional reconstruction of the plant and the sub-plant features/elements/sub-elements. This can be achieved, for example, by using a controllable arm/post on which at least one optical sensor is mounted at one or more heights to enable bringing the optical sensor to each required location in the plant vicinity. The optical sensors can provide images indicative of plant structure, dimensions and condition, as will be further described below;

Distance sensors, such as ultrasound sensors, can be used to provide data indicative of relative dimensions of a plurality of sub-plant features/elements. Distance sensors can be depth sensors, for example a pair of fixed spatially separated cameras that can identify the distance of objects by the difference in their appearance between the two cameras. Depth sensors can be based on laser radar (LIDAR);

Location sensors that provide location data indicative of the location of plant or sub-plant features/elements. The location can be based on GPS or other spatial sensor based on global or local beacons, or by way of optical sensors detecting specially placed indicators of location, such as per-plant sign/number/barcode or sign per row or group of plants, while the detection of an individual plant can be performed by detecting the location of the plant within a group/row, for example by counting the plant from beginning of row. The sub-plant feature can be located by detecting its height from the ground or its distance from another plant feature, by optical and/or depth sensors described above;

Environmental sensors that can provide data indicative of temperature, lighting, $CO_2$ levels, and/or humidity in the vicinity of the plant or the sub-plant feature/element, or temperature of the specific sub-plant feature/element; temperature of specific sub-plant elements can be detected for example by use of IR detectors.

Non-limiting examples of treatment devices for applying treatment based on operation data from the management system include:

Treatment devices/systems described in WO18203337 and in WO2020/095290, assigned to the assignee of the present invention;

Devices for pollinating or pruning flowers, by vibration;

Devices for pruning flowers or branches, by heat or laser;

Devices for spraying pollen or insecticide;

Devices for spraying plant hormones;

Devices for spreading beneficial pests.

A whole or partial snapshot/copy of the database 108 may be downloaded to the autonomous sensing and/or treatment systems in order to allow processing and analysis that is relevant to specific actions of the system. This is done in order to either allow the system to operate once connection to the database is inaccessible or to allow local analysis of data which may be more energy and time efficient.

Figures 4A, 4B, 4C:
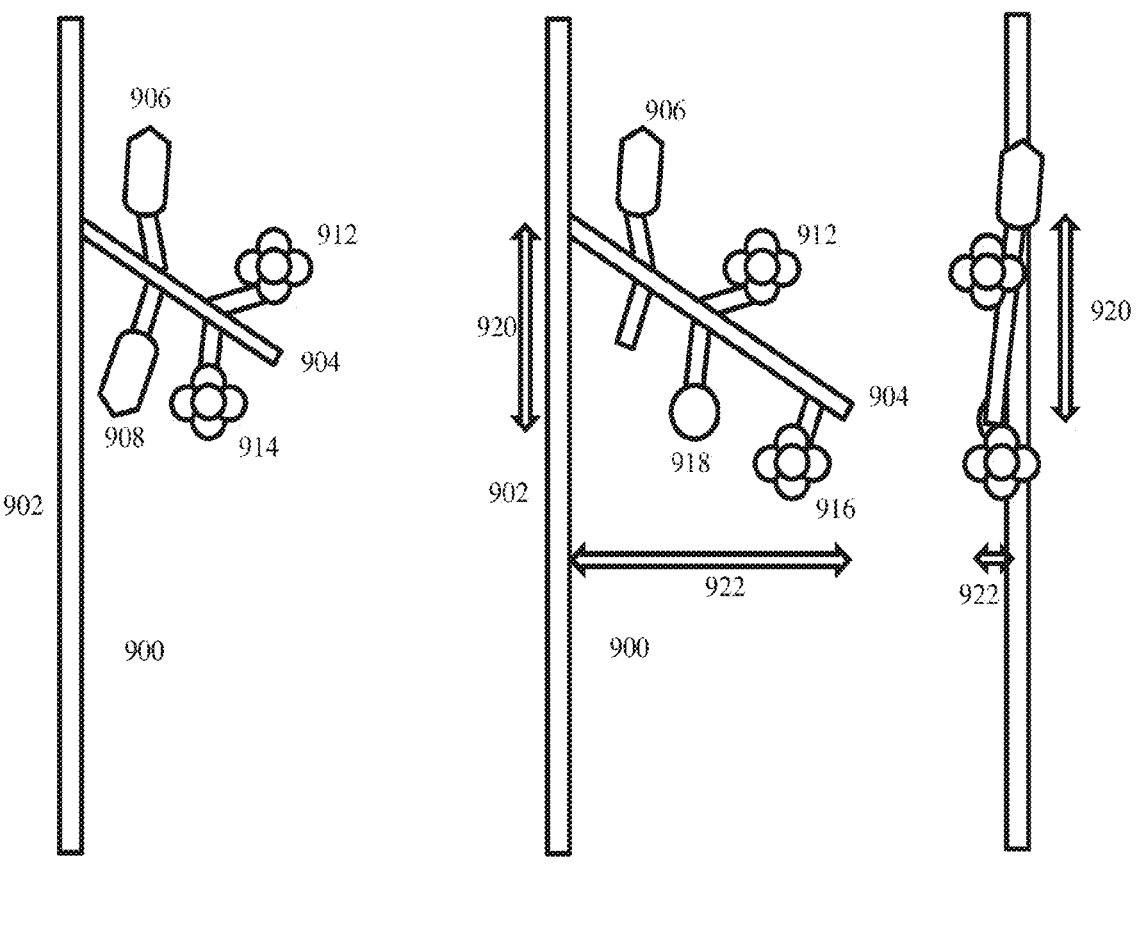
FIGS. 4A-4C illustrate a non-limiting example of obtaining sensing data and saving the sensing data in the database to enable reconstructing of a plant from different angles according to the invention.

A non-limiting example of obtaining sensing data and reconstructing of a plant in the database, utilizing algorithms in the database manager or in the local control system located within the sensing system, is given in FIGS. 4A-4C. In FIG. 4A, an example of a plant 900 with a main sub-plant feature stem 902 and branch 904 is shown. On the branch 904, there are four sub-elements: two leaves 906 and 908, and two flowers 912 and 914. This plant, as seen in FIG. 4A, was visited by Unit X1, on Date Y1 and recorded in the manner described. In an additional later visit by same unit X1 or another unit X2, on date Y2, the plant changed (see FIG. 4B). Leaf 908 does not exist anymore, therefore its data entry is marked as "removed", and flower 914 underwent pollination and fruit setting and a fruit 918 is visible, therefore flower entry 914 can be removed and replaced by fruit entry 918, or flower entry 914 can be updated to show it has changed to fruit entry 918. In addition, the branch 904 grew longer, therefore its length entry is updated, as well as an additional flower entry 916 is added as a sub-element to branch 904.

Due to the three-dimensional structure of any plant or tree, the identification and monitoring of sub-plant features is not trivial. While image analysis can detect the various parts of the plant, e.g. by training an image analysis algorithm to detect the various parts of the plant and understand the connection between them, e.g. which flower belongs to which branch, some elements can be obstructed from view. In these cases, imaging and/or LIDAR and/or depth imaging (two offset cameras and algorithm detecting the depth of objects in view), may not be enough. Additional sensing elements such as ultrasound reflection analysis can be used. The ultrasound waves can partially penetrate the external parts of the plant and reach inner parts, and the reflection from these parts can also be analyzed, and a complete 3-dimensional structure of the plant can be recovered.

When imaging the plant, the main issues of reconstructing all sub-plant features are obstructions and elements which are at an angle to the imaging sensor such that it does not allow the sensor to classify it. To this end, the sensing system may utilize multiple imaging sensors at different heights and positions, and since the system is mobile, at least moving along the plant rows, it is able to view the plant from various angles. This enables the sensing system to view the sub-plant features in various angles and to find them. When moving near a plant, the sensing system can constantly image the plant until it discovers a feature which is not visible prior to the specific system position. Once a new feature is discovered, or an existing registered feature is first seen in a new visit, the feature can be imaged and updated. The same movement also allows to choose the best angle to view and characterize a sub-plant feature. For example, a horizontal branch with several sub-elements such as leaves, flowers, sub-branches, when viewed head-on, is difficult to assess. If the branch is detected by way of its sub-elements, it can be tracked along the movement of the system, especially its size/length, the spatial separation of its sub-elements, and once these parameters reach specific pre-defined thresholds, or relative thresholds (relative to the movement/position of the system, or relatively between each other, i.e. the ratio of two such parameters), it means that this is the correct position to measure and the feature's characteristics can be updated in the database.

In the described example of FIGS. 4B and 4C, the same plant 900 is portrayed at two different angles, where branch 904 is seen from the side in FIG. 9B and from the head-on in FIG. 4C. When viewed, as seen in FIG. 4C, it is difficult to measure the length of the branch and some sub-elements are obstructed, e.g. fruit 918. When the system is moving along the row next to plant 900 it will view it from various angles. When detecting the branch 904 and its sub-elements, the length of the branch in both the vertical (920) and horizontal (922) axes can be measured, and the position to fully evaluate the branch is the maximum in at least one of the axes, in this case the horizontal one (922). The same can be done either separately or in combination with the distance between the sub-elements, for example the horizontal distance between the flowers 912 and 916, or the maximum of the average horizontal distance between all sub-elements of the branch. In case of multiple cameras at different angles or different heights, the same can be done by comparing horizontal distances, as described, at a single position of the system, when branch is viewed by two different cameras placed at the same height but at two different angles form the plant. If two cameras viewing the branch are separated vertically, perhaps the vertical distance/length is the more crucial parameter to be optimized before measuring the branch parameters and updating the database.

In addition, another issue is that while moving, the distance between the sensing system and its cameras from the plant and its sub-elements is constantly changing. Therefore, while the angle to a branch may be approaching a side view with maximum horizontal length, the total distance can increase thus reducing all parameters measured. In this case, a ratio between two parameters such as horizontal to vertical lengths should be maximized.

Reconstruction of the plant structure can be as follows. Besides detecting all plant sub-features using sensors (as explained above), in order to reconstruct the plant it is necessary to connect between each element and its sub-elements. For example, once a branch and its sub-branch are detected (by way of imaging sensors, or LIDAR or other, trained to detect such elements), while the sensing system is moving along the plant row adjacent to a specific plant being imaged/detected, a set of images is captured at various angles while the system is moving and with different cameras/sensors at different positions/angles, the physical proximity of the sub-element to its parent element must be observed in all images, or at least not be contradicted in any angle of imaging. For example, as seen with regard to the physical connection between branch 904 and main stem 902. In both angles as seen in FIGS. 4B and 4C, the branch 904 is in contact with stem 902. However, leaf 906 is seen in contact with main stem in FIG. 4C but not in FIG. 4B. It can therefore be concluded that branch 904 is a sub-element of stem 902 and leaf 906 is a sub-element of branch 904.

Since the structure is complex, in order to ensure the reconstruction of the plant, scheduled daily visits might be necessary in order to detect small changes in the plant and its sub-plant features and track them.

In some cases, it may be difficult to build a full 3-dimensional structure including all sub-plant features, especially due to the density of features in case of large plants/trees and obstruction of view. In this case, another option is to map the density of features per unit volume or area. For example, by detecting flowers and their distance from the sensing imaging devices a 3-dimensional reconstruction can be performed of the flower structure and their position with regards to the plant, even if each flower cannot be directly connected to a specific branch or sub-branch. The same can be done for branches, fruits, etc.

Accordingly, the database structure per plant will have the characteristics of the plant and the sub-plant features and their sub-elements.

A visit to a plant, the actions and database update can be performed in the following manner:

1. Reach specific plant—identification of plant is based, for example, on location data of the plant or on sub-plant features of the plant as saved in the database from a last visit;
2. Add new visit entry in database, including the autonomous unit performing the visit, and date of visit;
3. Update plant characteristics and sub-plant features, such as environmental and soil conditions, geometrical parameters (branch lengths, number of leaves/flowers/etc.), and/or condition (fruit ripens/color);
4. Addition of sub-plant entries in plant database, such as new stems/branches/flowers/fruits/etc., and their characteristics;
5. Add/update plant and sub-plant stress conditions such as existence of pest/disease;
6. Add new action entries, such as action in response to detection of stress, e.g. spray pesticide on plant or part of plant where pest was recognized and treated, or planned action such as pollination, pruning or other treatment pre-defined by user or automated plan;
7. Update data entries or previous action entries, such as checking pest/disease condition following previous visit where stress was detected and treated.

In some cases, the database can have a slightly different structure. For example in open field crops, where there is a large number of plants per unit area, and sometimes it is difficult to collect individual data on each and every plant, the main data entry can be not of a specific plant but of a unit area in the field. The sub-entries can be similar to the plant entries, e.g. planting date, type/variety, soil and environmental information as well as other treatment data, and the sub-plant features are replaced by the unit area features, e.g. average height of plants in area, as well as other features such as color of plants, leaves, number of fruits/flowers, stress conditions, as well as visit entries.

For each plant database entry record, the database stores information regarding the location of each of the plants in the greenhouse/orchard/field. This is needed in order to (1) provide plant action information to autonomous systems and/or humans in order to be able to return to the specific plant and monitor its development, or perform needed treatments following detection of stress or required actions such a pollination and pruning, whether by the autonomous system or a human; (2) provide coordinates when performing visits, so that plant characteristics will be updated for the correct plant, in order to keep track of the plant and sub-plant features' development, and after constructing the full structure of the plant, it may help when visiting the same plant routinely to view and track its features.

The location of the plants is not trivial. In cases like greenhouse tomatoes, the active part of the plant (with leaves and fruit trusses) may be moved from time to time such that the active part gets separated in space from the planting site, sometimes even tens of meters. In such cases, marking the plants individually with signs, such as barcodes or RFID can be useful. It is possible to mark only one plant in a row and using sensors such as cameras, count the different plants relative to the marked plant. When routinely visiting the plants, e.g. every day or every other day, the changes between visits are small and can help the system recognize the plant by comparing images or other sensor data between visits and an algorithm can assure the same plant was visited. These methods ensure that the data entries updated for the plant, as well as those removed or added, are correct.

Therefore, in an orchard or greenhouse, a plant/tree can have coordinates which are absolute (i.e. using GPS coordinates), or relative to the area monitored, for example having a row number and then a plant number in the row. These methods can cover most cases unless plants are moved around (as in a tomato greenhouse) or plants are added/removed. One robust method can include a marking of one row (for example a row number, from which all rows are sequentially numbered), and in each row one plant is marked. In this case, even if plants are moved such as in the case of greenhouse tomatoes, all plants can be accurately identified by their row number relative to the first row, and their number in the row, relative to the single plant marked.

Figure 5A:
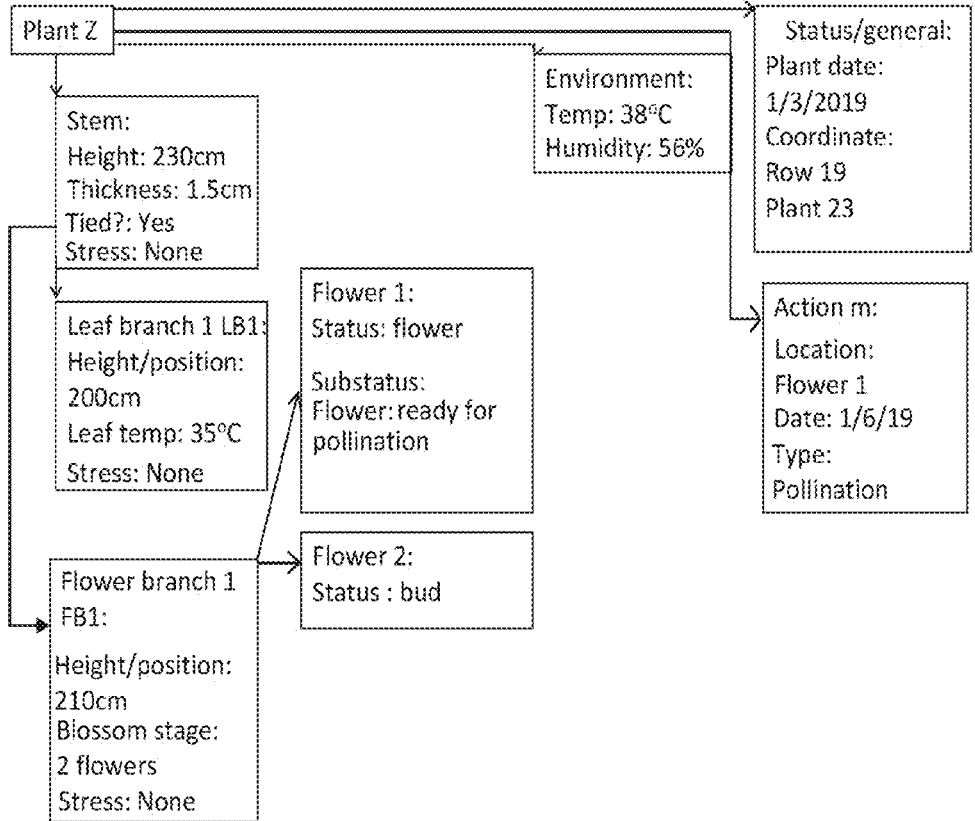
FIGS. 5A-5B illustrate a non-limiting example of two database entry records of a specific plant after two visits to the plant, according to the invention.
Figure 5B:
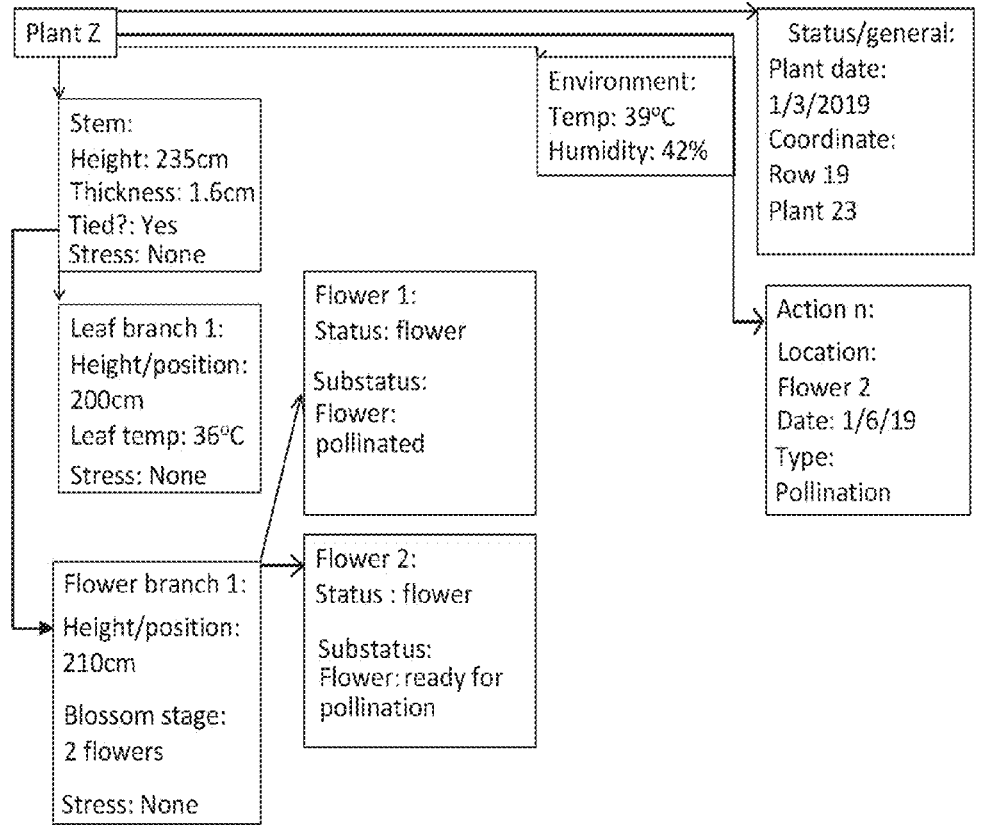

FIGS. 5A-5B depict a database entry record of a specific plant following two visits. FIG. 5A depicts the database entry record of plant Z, planted on Jan. 3, 2019, as the plant no. 23 in row no. 19 of a growing area/field/greenhouse. In the visit, performed on Jan. 6, 2019, environmental conditions (temperature and humidity) of the plant vicinity, dimensions and condition of the stem, leaf branch LB1 and flower branch FB1 are detailed, as shown. The flower branch FB1 has two flowers, one ready for pollination (flower F1) and one is a bud (flower F2). On that visit, the management system generates operation data to pollinate the flower F1, as shown under action m. In some embodiments, the pollination system is integrated in the sensing system performing the visit and the flower F1 is immediately pollinated and this fact is then also recorded in the action m menu. In the pursuant visit, performed on Mar. 6, 2019, as seen in FIG. 5B, changes in dimensions and conditions of the stem, leaf branch LB1 and flower branch FB1 are detected and recorded, the environmental conditions (temperature and humidity) of the plant vicinity are updated. The flower F1 is inspected and its status is updated to "pollinated" upon detection of a successful pollination, in view of the pollination action executed in the previous visit. The second flower F2 is inspected and its status is updated to "ready for pollination", therefore the management system generates operation data to pollinate flower F2 as indicated under action n. Again, a pollination system, whether integral with the sensing system or not, is summoned to perform pollination of the Flower F2, and the sensing system then inspects, at the end of the pollination or during a subsequent visit, the status of flower F2 and updates its status to "pollinated", if successful pollination is detected, or to "additional pollination is required".

The invention claimed is:

1. A plant management system for managing operation of one or more plant growth zones being subscribers of the management system, the management system comprising:

a storage device comprising a database and being configured and operable to store a plurality of entry records corresponding to a respective plurality of plants in each of one or more plant growth zones, each entry record comprising data indicative of plant characteristics for a respective individual plant in the plant growth zone, the plant characteristics comprising spatial and environmental characteristics and location of the individual plant in the plant growth zone; and a data processing unit comprising a database manager, said database manager being configured to communicate with one or more sensing systems of the subscribers to receive and process visit data, provided by said or more sensing systems, and create the entry records in association with respective individual plants, the visit data comprising time and location data of execution of said visit by the one or more sensing systems for each individual plant in the plant growth zone, and sensing data for said each individual plant, said database manager comprising:

a sub-plant features extraction module configured and operable to analyze sensing data, being part of the visit data with respect to the individual plant, and identify spatial sub-plant features of each individual plant sensed during the visit in relation to spatial sub-plant level characteristics of the individual plant, wherein the spatial sub-level characteristics of the individual plant comprise one or more of the following: specific branches of the individual plant, specific leaves on a given branch of the individual plant, specific flowers and/or fruits on a given branch of the individual plant, specific flower branches/trusses of the individual plant, specific flowers and/or fruit on a given flower of the individual plant, and wherein the sub-plant features in relation to said spatial sub-plant level characteristics of the individual plant comprise one or more of the following: geometry, dimensions, number, health state, and temperature of one or more of branches, trusses, inflorescences, leaves, flowers and fruits; and a plant structure data generation module configured and operable to analyze the spatial sub-plant features being identified by the sub-plant features extraction module, and generate corresponding up-to-date plant structure data of the respective individual plant configured to form the entry record whose contents comprise a virtual representation of the corresponding individual plant's structure in accordance with locations of the spatial sub-plant features and their dimensions matching a real structure of said individual plant, and a history of visits with respect to the location of each individual plant in the plant growth zone indicative of developments of the real structure of the individual plant;

the database manager being configured and operable to selectively carry out the following: in response to the visit data, create a new entry record to be stored in the database or update an existing entry record stored in the database, corresponding to a respective individual plant in the plant growth zone; in response to data request input with respect to one or more individual plants in the plant growth zone, create a data retrieval record; and analyze data indicative of the plant characteristics in the entry record stored in the database, and, upon identifying a predetermined condition of the one or more sub-plant features, generate and communicate corresponding operation data to said one or more plant growth zones to apply a visit to the respective individual plant;

wherein the operation data generated by the database manager is further indicative of one or more treatment plans to be applied by one or more treatment systems to the spatial sub-plant feature(s) of the relevant individual plant(s);

wherein the plant management system is further configured to communicate the operation data to the one or more treatment systems to apply the one or more treatment plans, and create a database entry treatment record in response to treatment data being received from the one or more treatment systems, the treatment data comprising data indicative of a treatment applied by the one or more treatment systems to a spatial sub-plant feature of the relevant individual plant, to thereby store the database entry treatment record and assign it to the spatial sub-plant feature.

2. The system according to claim 1, wherein said visit data further comprises at least one of the following:

environmental data indicative of said environmental characteristics of each individual plant, and wherein said database entry record is indicative of temperature of a portion of the individual plant and/or indicative of temperature and/or humidity in a vicinity of each individual plant in the plant growth zone; and soil condition data, and wherein said database entry record is indicative of nutrition and/or water content associated with each individual plant in the plant growth zone.

3. The system according to claim 1, wherein said spatial sub-plant features of each individual plant further comprise health state of flowers, said health state of the flowers comprising pollination and/or pruning state of the flowers.

4. The system according to claim 1, wherein said treatment plan comprises applying pollination and/or pruning and/or disinfection to said spatial sub-plant feature of the relevant individual plant.

5. The system according to claim 1, characterized by at least one of the following:

comprising one or more sensing systems configured and operable to provide said sensing data, each sensing system comprising one or more sensors including at least one imaging sensor such that said visit data comprises image data of said spatial sub-plant features; and being associated with a central station comprising said storage device and said database manager, the central station being configured as a computer system for data communication, via a communication network, with the one or more sensing systems and/or the one or more treatment systems.

6. The system according to claim 1, comprising one or more treatment systems configured and operable to apply said one or more treatment plans.

7. The system according to claim 1, comprising one or more sensing systems and/or treatment systems carried by one or more robotic vehicles configured to navigate inside the plant growth zone, based on the operation data from said database manager, to apply said one or more visits to said one or more individual plants in the plant growth zone.

8. A method for managing data of plants in one or more plant growth zones, the method comprising:

receiving visit data in relation to the plant growth zone, the visit data comprising time and location data of execution of the visit by one or more sensing systems to each individual plant in the plant growth zone, and sensing data obtained by said one or more sensing systems from the each individual plant in the plant growth zone, the visit data being indicative of plant characteristics for the each individual plant in the plant growth zone comprising plant spatial and environmental characteristics and plant location in the plant growth zone;

analyzing the visit data to identify spatial sub-plant features of each individual plant, sensed during the visit, in relation to spatial sub-plant level characteristics, wherein the spatial sub-level characteristics comprise one or more of the following: specific branches of the individual plant, specific leaves on a given branch of the individual plant, specific flowers and/or fruits on a given branch of the individual plant, specific flower branches/trusses of the individual plant, specific flowers and/or fruit on a given flower of the individual plant, and wherein the spatial sub-plant features in relation to said spatial sub-plant level characteristics of the individual plant comprise one or more of the following: geometry, dimensions, number, health state, and temperature of one or more of branches, trusses, inflorescences, leaves, flowers and fruits;

analyzing the spatial sub-plant features being identified and generating corresponding up-to-date plant structure data of the respective individual plant, and utilizing the visit data and the up-to-date plant structure data and creating an entry record in the database whose contents comprise a virtual representation of the corresponding individual plant's structure in accordance with locations of the spatial sub-plant features and their dimensions matching a real structure of the individual plant, and a history of visits with respect to the location of the individual plant in the plant growth zone indicative of developments of the real structure of the individual plant;

based on data being received, selectively carrying out the following: managing creation of a new entry record in the database or update of an existing record in the database corresponding to the respective individual plant in the plant growth zone; generation of a data retrieval record; and analyzing the entry record stored in the database, and, upon identifying a predetermined condition of one or more sub-plant features, generating and communicating corresponding operation data to said one or more plant growth zones to apply a visit to the relevant individual plant, wherein the operation data is further indicative of one or more treatment plans to be applied by one or more treatment systems to the spatial sub-plant feature(s) of the relevant individual plant(s); and communicating the operation data to the one or more treatment systems to apply the one or more treatment plans, and creating a database entry treatment record in response to treatment data being received from the one or more treatment systems, the treatment data comprising data indicative of a treatment applied by the one or more treatment systems to a spatial sub-plant feature of the relevant individual plant, to thereby store the database entry treatment record and assign it to the spatial sub-plant feature.

9. The method according to claim 8, wherein said visit data further comprises at least one of the following:

environmental data indicative of environmental characteristics of each individual plant, thereby enabling recordation and/or retrieval of temperature of a portion of the individual plant and/or temperature and/or humidity in a vicinity of each individual plant in the plant growth zone; and soil condition data, thereby enabling recordation and/or retrieval of nutrition and/or water content associated with each individual plant in the plant growth zone.

10. The method according to claim 8, wherein said spatial sub-plant features of each individual plant further comprise health state of flowers, said health state of the flowers comprising pollination and/or pruning state of the flowers.

11. The method according to claim 8, wherein said treatment plan comprises applying pollination and/or pruning and/or disinfection to said spatial sub-plant feature of the relevant individual plant.

12. The method according to claim 8, wherein said sensing data comprises imaging data.

* * * * *